(12) United States Patent
Diks-Warmerdam et al.

(10) Patent No.: US 9,629,380 B2
(45) Date of Patent: Apr. 25, 2017

(54) FREEZER AND METHOD OF ITS OPERATION

(71) Applicant: Conopco, Inc., Englewood Cliffs, NJ (US)

(72) Inventors: Leonie Martine Diks-Warmerdam, Noordorp (NL); Hans Hoogland, Hellevoetsluis (NL); Georgios Tetradis-Mairis, Bedford (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 9 days.

(21) Appl. No.: 14/430,250

(22) PCT Filed: Aug. 28, 2013

(86) PCT No.: PCT/EP2013/067763
§ 371 (c)(1),
(2) Date: Mar. 23, 2015

(87) PCT Pub. No.: WO2014/048657
PCT Pub. Date: Apr. 3, 2014

(65) Prior Publication Data
US 2015/0272162 A1    Oct. 1, 2015

(30) Foreign Application Priority Data

Sep. 28, 2012 (EP) .................................. 12186466

(51) Int. Cl.
*F25D 11/00* (2006.01)
*A23G 9/04* (2006.01)
*F25D 17/06* (2006.01)

(52) U.S. Cl.
CPC ............... *A23G 9/04* (2013.01); *F25D 17/06* (2013.01); *F25D 2317/0661* (2013.01)

(58) Field of Classification Search
CPC .......... A23G 9/00; A23G 9/225; F25D 17/06; F25D 3/08; F25D 2303/082;
(Continued)

(56) References Cited

U.S. PATENT DOCUMENTS

| 5,896,748 A | 4/1999 | Park | |
| 2005/0217282 A1* | 10/2005 | Strohm | A23B 7/152 62/78 |

(Continued)

FOREIGN PATENT DOCUMENTS

| CN | 1181493 | 5/1998 |
| CN | 1724958 | 1/2006 |

(Continued)

OTHER PUBLICATIONS

IPRP2 in PCTEP2013067763, Dec. 15, 2014.
(Continued)

*Primary Examiner* — Elizabeth Martin
(74) *Attorney, Agent, or Firm* — Foley & Lardner LLP

(57) ABSTRACT

A freezer for storing frozen confectionery products, the freezer comprising a substantially sealed openable chamber for storing the frozen confectionery products and having a lower region and an upper region, the lower region comprising air circulation means for directing air from the lower region to the upper region and refrigeration means for chilling the chamber.

9 Claims, 2 Drawing Sheets

(58) Field of Classification Search
CPC ......... F25D 2317/651; F25D 2317/661; F25D 2317/0661; F25D 2331/804; F25D 2400/36; F25D 2400/30; F25D 25/022
See application file for complete search history.

(56) References Cited

U.S. PATENT DOCUMENTS

2008/0156029 A1* 7/2008 Ritchie ................. F25D 17/065
62/408
2010/0180616 A1* 7/2010 Linder .................. A47F 3/0413
62/248
2014/0174109 A1* 6/2014 Langenberg ............ F25D 29/00
62/56

FOREIGN PATENT DOCUMENTS

| CN | 201001519 | 1/2008 |
|---|---|---|
| DE | 10345932 | 4/2005 |
| EP | 0769262 | 12/1999 |
| EP | 1525803 | 4/2005 |
| GB | 2394527 | 4/2004 |
| WO | WO2008058373 | 5/2008 |
| WO | WO2011110648 | 9/2011 |

OTHER PUBLICATIONS

Search Report in PCTEP2013067763, Oct. 15, 2013.
Written Opinion 1 in PCTEP2013067763, Aug. 26, 2014.
Written Opinion in PCTEP2013067763, Oct. 15, 2013.

* cited by examiner

FREEZER AND METHOD OF ITS OPERATION

TECHNICAL FIELD

The present invention relates to a freezer containing frozen confectionery products and method of its operation.

BACKGROUND AND PRIOR ART

Retail outlets for frozen confectionery typically store the frozen confectionery in a freezer. Such freezers are essentially the same as domestic freezer appliances, having a chamber in which the frozen confectionery is stored, which is chilled by refrigeration apparatus.

Most frozen confectionery products are to be stored within narrow temperature ranges, in order to maintain product quality. However one drawback of such freezers is that they tend to suffer from large temperature gradients. Such temperature gradients are established due to fact that warm air is less dense than cold air and also because the majority of the heat ingress occurs through the upper surface of the chamber, as the walls and base are typically thermally insulated.

Often this temperature gradient is merely tolerated, and large temperature differences can exist between the average product temperature and the coolant to compensate the heat entering the cabinet through the lid. Additionally in order to ensure that the maximum allowable product temperature is not breached, the refrigeration temperature needs to be set much lower than the temperature of the products, especially those near the surface of the chamber.

Alternatively, steps can be taken to circulate the air within the freezer to ensure turbulent mixing of air, e.g. by installing ventilator fans, and thus eliminating the temperature gradients within the freezer by bulk movement of air. This can provide a homogeneous temperature within the freezer. However, even though the freezer can be operated closer to the maximum tolerance temperature than in the stagnant case, this surprisingly comes at the cost of increased energy consumption. This is due firstly to the energy requirement of agitating the air, and secondly because the bulk flow of the air near the surface of the freezer increases the rate of transport of heat through the surface, increasing the load on the refrigeration unit.

Thus improvements in the operation of such freezers would be highly desirable.

SUMMARY OF THE INVENTION

The present invention relates to a freezer for storing frozen confectionery products, the freezer comprising a substantially sealed openable chamber for storing the frozen confectionery products and having a lower region and an upper region, the lower region comprising air circulation means for directing air from the lower region to the upper region and refrigeration means for chilling the chamber.

The chamber typically comprises a base, side walls and an upper surface. The chamber also comprises an opening to enable a consumer to extract the chosen product. A common arrangement is for the upper surface to comprise a viewing window so that the consumer can view the frozen confectionery before opening the chamber to take the chosen product. In many cases the viewing window takes up the entire upper surface of the freezer in so-called glass-lid freezers. It is also common for the chamber to comprise baskets, which contain the frozen confectionery product and prevent them contacting the cold walls of the chamber.

In another aspect, the invention relates to a method of operating such a freezer, wherein the air circulation means are operated such that a temperature gradient between air in the lower region and warmer air in the upper region is maintained.

Such agitation does not disturb the air in contact with the upper surface of the chamber and as such the temperature gradient is merely reduced and not eliminated.

The reduction in the gradient from that which would exist in a purely stagnant air arrangement means that the temperature at the base of the freezer does not need to be so low and thus the heat load on the refrigeration means is reduced and less energy is consumed.

Additionally, unlike in the case of operating with bulk turbulent air flows, the air at the surface is not disturbed, so that there is no increase in heat flow into the chamber due to the operation of the air circulation means.

As a result it has been surprisingly found that, provided the air circulation means only provide gentle agitation and a temperature gradient is preserved, the energy consumed by the refrigeration means is reduced and that furthermore the reduction exceeds the additionally energy cost of operating the fan.

In particular, for a given maximum product temperature the total energy consumed is surprisingly even lower than that consumed in a purely stagnant air arrangement, even with the additional energy cost of the air circulation means.

Typically the air circulation means are the only source of induced airflow and no other sources of airflow are active.

For a typical ice-cream product freezer the maximum tolerable product temperature is −18° C. Thus the temperature of the air and of the products at the upper end of the chamber is preferably from −20 to −18° C. At the lower end of the chamber the temperature is preferably from −24 to −22° C.

The temperature gradient in the freezer is such that the difference in average air and products temperature between the upper end of the chamber and the lower end of the chamber is from 1.0 to 4.0° C., more preferably from 1.5 to 3.5° C.

In this invention 'substantially sealed' means that that the chamber is completely or nearly completely sealed from the ambient air. However it may be possible that there are minor breaches in the sealed nature of the chamber, for example by the presence of ventilation holes or passages through attached fans or other equipment. In any case, such openings will be minor and not capable of inducing bulk flow of movement of air within the chamber and merely provide a diffusion channel for the air.

As discussed, the air circulation means are only operated to provide a gentle agitation of air in a generally upwards direction from the lower region of the chamber to the upper region of the chamber. Thus the air is gently pushed upwards, reducing the temperature gradient by moving colder air into the warmer region above but not disturbing the air in contact with the upper surface of the chamber. In another preferred mode of realisation of the invention, the air can also go downwards if the right fan is correctly positioned and operated (size and speed).

The air circulation means may be fans, e.g. built into the chamber walls or into the product baskets, if they are present. However other methods of inducing air circulation in a gently manner could be envisaged.

The invention will now be illustrated by the following examples and with reference to the following figures, in which.

EXAMPLES

Figure 1:
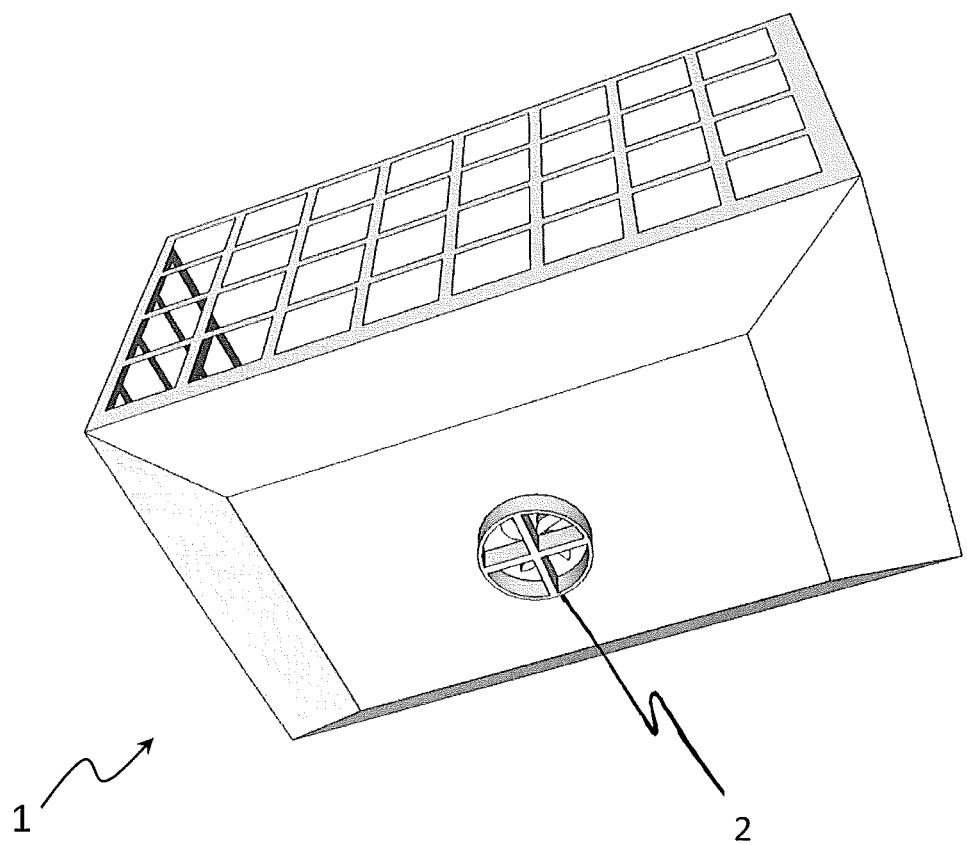
FIG. 1 is a schematic representation of the underside of a basket for insertion into a chamber of a freezer according to the present invention.
Figure 2:
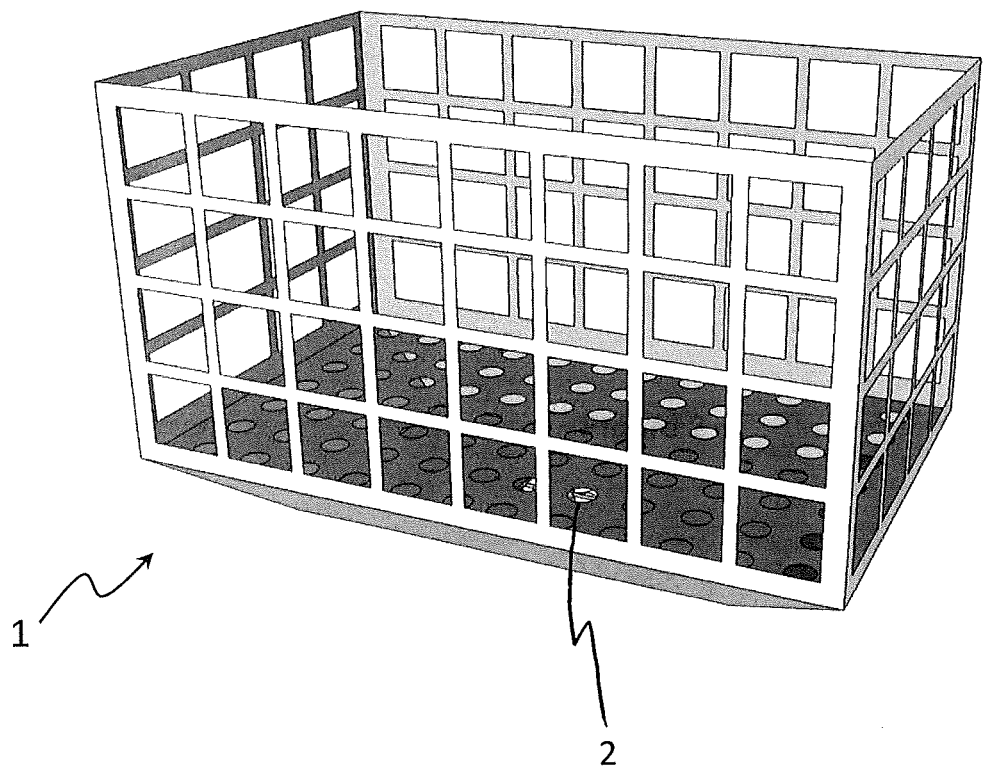
FIG. 2 is a schematic representation of a side view of the basket shown in FIG. 1.

A VT300 freezer cabinet comprising product baskets was filled to a typical level with ice cream confectionery products. The freezer was adapted by the installation of small fans (2) at the base of each basket (1), as shown in FIG. 1. The baskets also had a diffuser base extension, to distribute the upwards airflow from the fan more widely across the basket, also as shown in FIG. 1.

The freezer was operated in a stagnant air configuration with the fans turned off and in a configuration where gentle upwards airflow was provided by the fans. The ambient temperature outside the freezer was held at 25° C. and 60% RH. In both cases the freezer was operated to maintain a maximum product temperature of −18° C. The temperature distribution inside the freezer and energy consumption for both modes of operation was measured. The results are shown below in table 1.

TABLE 1

|  | Original configuration | With fans | Difference |
|---|---|---|---|
| Total energy consumption | 2.909 kWh/24 h | 2.784 kWh/24 h | 4.3% |
| Energy consumption appliance | 2.909 kWh/24 h | 2.708 kWh/24 h | 6.9% |
| Energy consumption fan | 0 kWh/24 h | 0.077 kWh/24 h | — |
| Compressor run time | 44.4% | 40.1% | 9.6% |
| Warmest ice cream | −18.0° C. | −18.0° C. | 0% |
| Average temperature of top layer ice cream in the basket | −18.6° C. | −18.4° C. | 0.2 K |
| Average temperature of bottom layer ice cream in the basket | −23.7° C. | −20.8° C. | 2.9 K |
| Temperature difference average top and average bottom layer of ice cream | 5.1 K | 2.4 K | 2.7 K |

Results at 25° C. and RH = 60% and warmest ice cream at −18° C.

It can be seen that the gentle operation of the fans reduced the temperature gradient from 5.1° C. to 2.4° C. which enabled the temperature at the base of the freezer basket to increase from −23.7° C. to −20.8° C. without substantially changing the temperature at the top of the freezer from −18.6° C. to −18.4° C. The warmer temperature at the bottom of the freezer meant that the refrigeration load was reduced and less energy was consumed. Surprisingly the energy saved in this manner exceeded that spent on the fans, thus reducing the overall energy consumed as compared to the stagnant mode of operation.

The invention claimed is:

1. A freezer for storing frozen confectionery products, the freezer comprising a substantially sealed openable chamber for storing the frozen confectionery products and having a lower region and an upper region, the lower region comprising air circulation means for directing air from the lower region to the upper region and refrigeration means for chilling the chamber, and wherein the chamber is defined by a base, walls, and an upper surface, the upper surface comprising a viewing window, and wherein the freezer operates the air circulation means such that the air circulation means provide a gentle agitation of air in a generally upwards direction from the lower region of the chamber to the upper region of the chamber; wherein the chamber comprises removable baskets for containing the frozen confectionery products and wherein the air circulation means comprise fans built into the removable baskets.

2. The freezer according to claim 1, wherein the freezer includes frozen confectionery products and the freezer operates the air circulation means such that a temperature gradient between air in the lower region and warmer air in the upper region is maintained, and wherein the temperature gradient in the freezer is such that the difference in average temperature between those products at the top of the chamber and those at the bottom of the chamber is from 1.0 to 4.0° C.

3. The freezer according to claim 2, wherein the difference in average temperature between the upper end of the chamber and the lower end of the chamber is from 1.5 to 3.5° C.

4. The freezer according to claim 2, wherein the temperature at the upper end of the chamber is from −20 to −18° C.

5. The freezer according to claim 2, wherein the temperature at the lower end of the chamber is from −24 to −22° C.

6. A method of operating a freezer including a substantially sealed openable chamber defined by a base, walls, and an upper surface, the upper surface comprising a viewing window, the substantially sealed openable chamber including a removable basket, a lower region configured to store frozen confectionery products and including air circulation means, and an upper region configured to store frozen confectionery products, the method comprising:

operating the air circulation means such that a temperature gradient between air in the lower region and warmer air in the upper region is maintained;

wherein the temperature gradient in the freezer is such that the difference in average temperature between the frozen confectionery products at the top of the chamber and the frozen confectionery products at the bottom of the chamber is from 1.0 to 4.0° C. wherein the air circulation means comprises a fan built into the removable basket.

7. The method of operating a freezer according to claim 6, wherein the difference in average temperature between the upper end of the chamber and the lower end of the chamber is from 1.5 to 3.5° C.

8. The method of operating a freezer according to claim 6, wherein the temperature at the upper end of the chamber is from −20 to −18° C.

9. The method of operating a freezer according to claim 6, wherein the temperature at the lower end of the chamber is from −24 to −22° C.

* * * * *